United States Patent [19]

Jang

[11] Patent Number: 5,263,814
[45] Date of Patent: Nov. 23, 1993

[54] WATER DRIVEN TURBINE

[76] Inventor: Young-Wan Jang, 138-1 Samha-li, Janghung-Myun, Yangjoo-Kun, Kyungki-Do, Rep. of Korea

[21] Appl. No.: 906,586
[22] Filed: Jun. 30, 1992
[30] Foreign Application Priority Data May 21, 1992 [KR] Rep. of Korea ............ 92-8591

[51] Int. Cl.$^5$ .................................. F03B 1/00
[52] U.S. Cl. ................................. 415/63; 415/69; 415/80; 415/81
[58] Field of Search ............ 415/63, 69, 80, 81
[56] References Cited

U.S. PATENT DOCUMENTS

| 69,294 | 9/1867 | Wynkoon | 415/69 |
| 191,668 | 6/1877 | Good | 415/69 |
| 290,039 | 12/1883 | Griffith | 415/63 |
| 2,596,276 | 5/1952 | Napoli | 415/80 |
| 3,286,984 | 11/1966 | Bachl | 415/69 |
| 3,926,534 | 12/1975 | Erickson | 415/80 |

Primary Examiner—Edward K. Look
Assistant Examiner—Michael S. Lee
Attorney, Agent, or Firm—Lieberman & Nowak

[57] ABSTRACT

An improved water turbine which has a first rotatable cylinder having a water inlet hole and a plurality of nozzles, and a second rotatable cylinder having a plurality of rotating blades on the inner surface is disclosed. Water dropped from an altitude enters the first rotatable cylinder through the water inlet hole, where it is injected to the outside of the first rotatable cylinder causing the first rotatable cylinder to rotate. Water passing through the nozzles then strikes the rotating blades to rotate the second rotatable cylinder.

3 Claims, 4 Drawing Sheets

WATER DRIVEN TURBINE

FIELD OF THE INVENTION

The present invention is concerned with a water turbine having a first rotatable cylinder which is rotated by the propulsion of water through the nozzle formed on its circumference, and a second rotatable cylinder which is rotated by water striking rotatable blades formed on its inner surface, thereby minimizing loss of power.

BACKGROUND OF THE INVENTION

A common large scaled water turbine (mainly used in hydraulic power plants) is shown in FIG. 5. This water turbine (102) has a nozzle (101) and rotating blades (103). Water injected through the nozzle (101) strikes the rotating blades to make the water turbine (102) rotate.

Unfortunately, these water turbines lose a lot of power during rotation. That is, bounded water after striking the blades does not further effect the rotation of the water turbine and its energy is lost. Moreover, re-using bounded water is considered very difficult considering the structure of the known water turbines.

It is obvious that power efficiency is maximum when water strikes the rotating blades at a right angle. In relation to this, one reason why the known water turbines lose a lot of power during their rotation is because the rotating blades do not make right angles when struck by the water.

Moreover, since water is continuously injected through nozzles, rotation efficiency is expected to be maximum when water hits the blades continuously. However, since the arrangement and number of rotating blades are limited in the known water turbines, water cannot continuously hit the rotating blades. Accordingly, a great deal of power is lost during rotation.

SUMMARY OF THE INVENTION

It is an object of the present invention to provide a water turbine which re-uses bounded water (water which has hit and been repelled by the blades) to obtain maximum efficiency.

The water turbine of the present invention comprises a first rotatable cylinder which has a water inlet hole and a plurality of nozzles, a second rotatable cylinder which has a plurality of rotating blades, and two axes for supporting the first and the second rotating cylinders and transmitting power generated by the rotation of the two cylinders.

BRIEF DESCRIPTION OF THE FIGURES

Embodiments of the present invention will be described with reference to the accompanying drawings, in which.

DETAILED DESCRIPTION OF THE INVENTION

Figure 1:
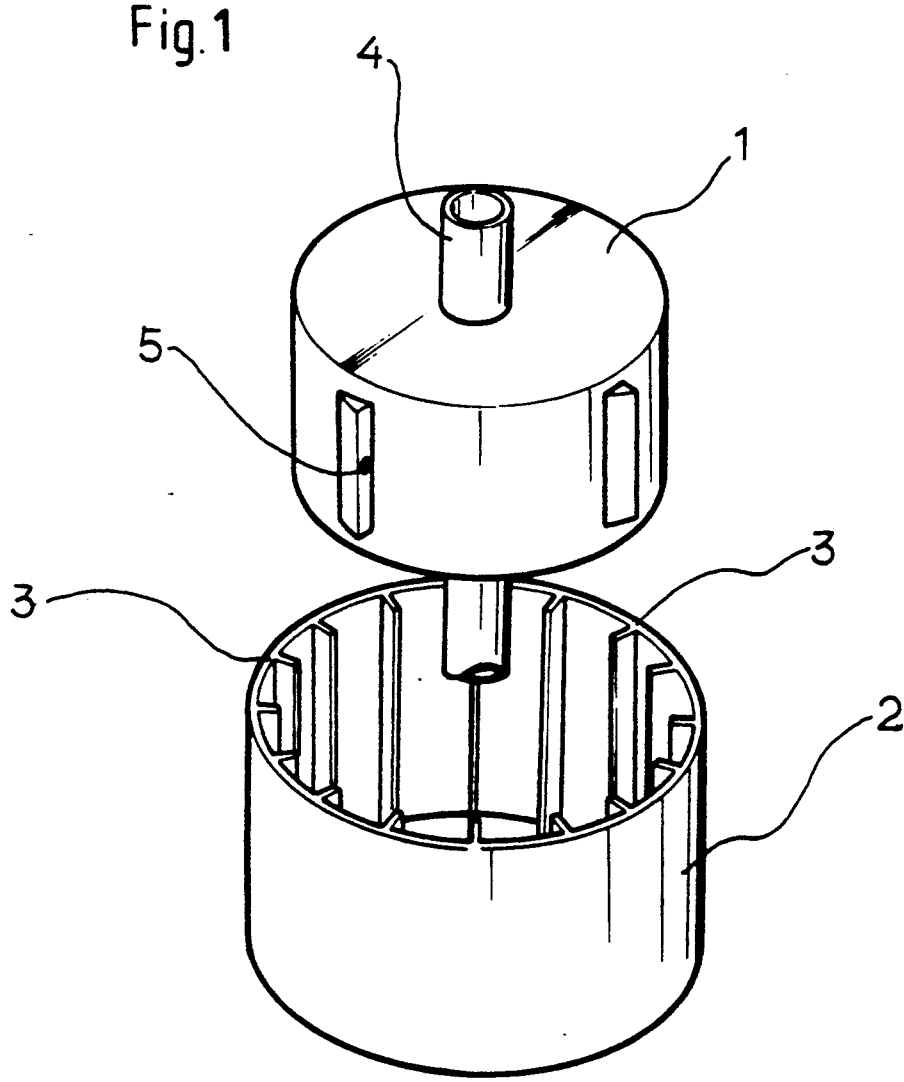
FIG. 1 is a perspective view of a generalized embodiment of the invention.

The subject invention will now be described in terms of its preferred embodiments. As shown in FIG. 1, the water turbine of the present invention has a first rotatable cylinder (1) and a second rotatable cylinder (2) formed within the circumference of the first rotatable cylinder (1). The first rotatable cylinder (1) has a water inlet hole (4) formed at its center. The second rotatable cylinder (2) has a plurality of rotating blades (3) formed on its inner surface.

Water dropped from an altitude enters the first rotatable cylinder (1) through the water inlet hole (4), and is injected to the outside of the first rotatable cylinder (1) through the nozzles (5), thereby rotating the first rotatable cylinder (1). Then, water injected through the nozzles (5) strikes the second rotatable cylinder (2) on the rotating blades (3), causing the second rotatable cylinder (2) to rotate.

Accordingly, the first rotatable cylinder (1) is rotated by the propulsion of water through the nozzles (5), and the second rotatable cylinder is rotated by water striking the rotating blades (3). Thus, the water turbine of the present invention makes it possible to re-use the power of water remaining after injection.

Maximum power can be generated when the rotation velocity of the water turbine is just a half of the velocity of the water striking the blades. Accordingly, if the velocity of water injected through the nozzles is "V," maximum power can be generated from the first rotating cylinder rotating at the velocity of "V/2." At the same time, since the velocity of water striking the rotating blades is "V/2," the maximum power can be generated from the second rotating cylinder when it rotates at the velocity of "V/4."

The above concept is described more in detail in Korean Patent Application Nos. 92-8951 and 91-11353, priority of which are claimed under 35 U.S.C. §119 and are herein incorporated by reference.

Since the velocity, direction and torque of the first rotatable cylinder (1) differs from the second rotatable cylinder (2) when obtaining power generated from the water turbine, it is desirable that each of the two rotatable cylinders (1 and (2 has its own independent power transmitting means.

Figure 2:
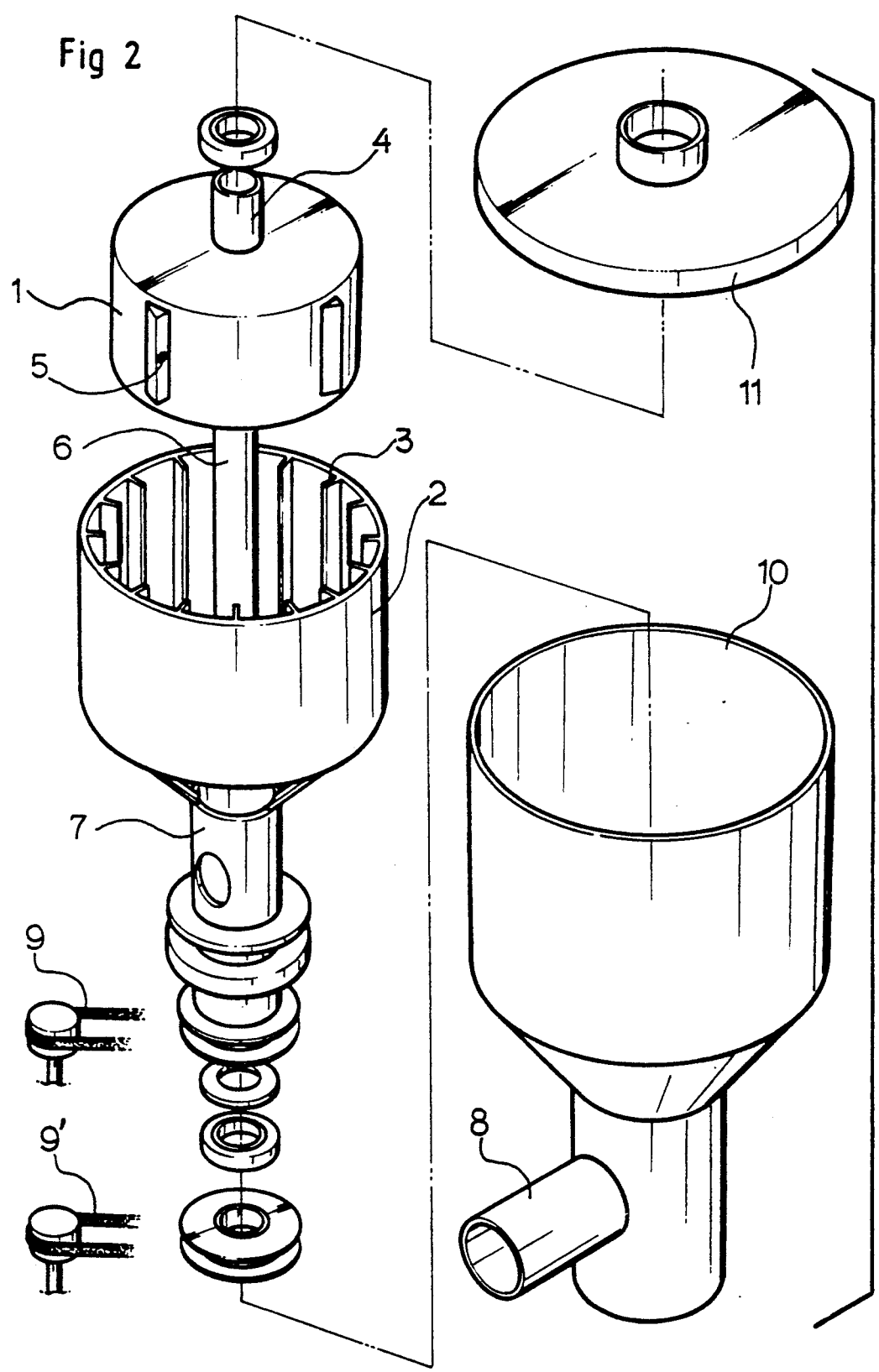
FIG. 2 is a perspective view showing a first embodiment of the invention.

The first embodiment of the present invention is shown in FIG. 2. In this embodiment, the water turbine has a first rotatable cylinder (1) and a second rotatable cylinder (2) within the circumference of the first rotatable cylinder (1). The first and the second rotatable cylinders (1) and (2) are located in a casing (10). The first rotatable cylinder (1) has a first rotating axis (7) connected at the center thereof. Each of the rotating axes (6) and (7) extends to the outside of the casing (10). Thus, the first and the second rotatable cylinders (1) and (2) can be supported by the first and second axes (6) and (7), respectively, and rotated in the casing (10). The terms "axis and axes" are used to describe any axle-type arrangement, the exact nature of which is readily determinable to one skilled in the art having read this disclosure.

The first rotatable axis (6) is connected to the first power transmitting means, and the second axis (7) is connected to the second power transmitting means.

The first rotatable cylinder (1) has a water inlet hole (4) at the center through which the water enters, and a plurality of nozzles (5) on its circumference through which the water in the first rotatable cylinder (1) exits to propel the first rotatable cylinder (5), causing it to rotate. After being injected through the nozzle (5), the water strikes a plurality of rotating blades (3) formed on the inner surface of the second rotatable cylinder (2), thereby rotating the second rotatable cylinder (2).

The casing (10) has a water outlet hole (8) formed at the lower portion thereof, through which the water exits after striking the rotating blades (3) of the second rotatable cylinder (2).

Figure 3:
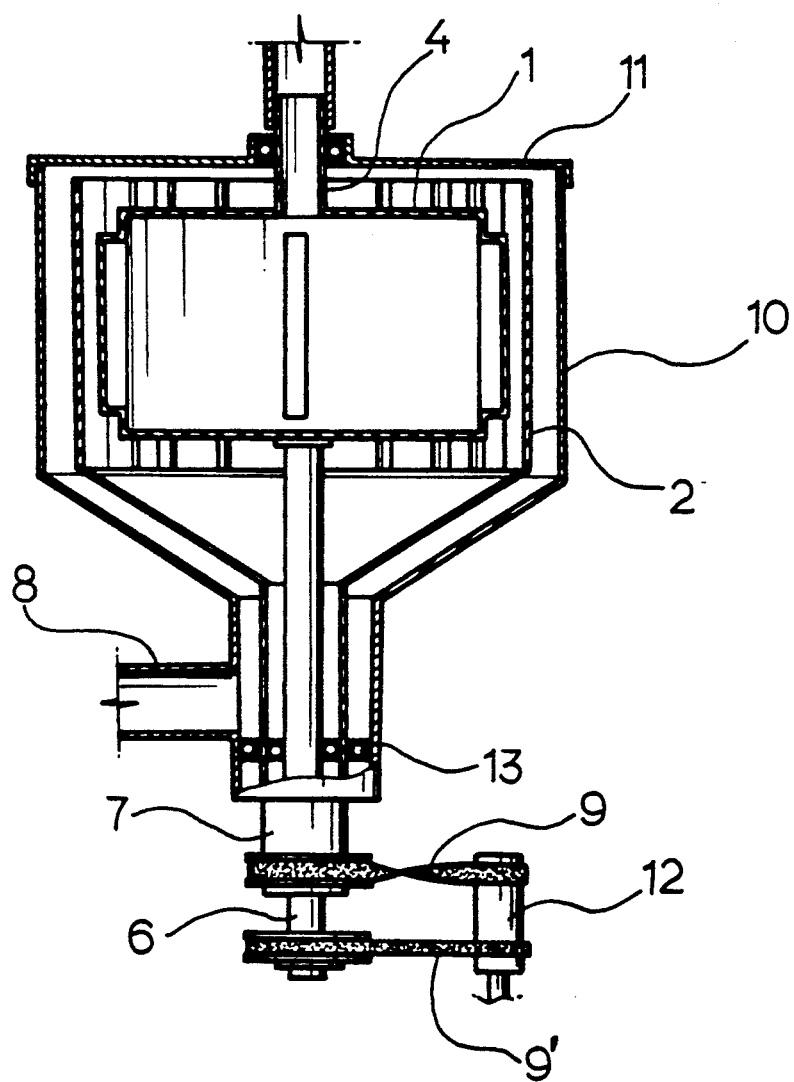
FIG. 3 is a vertical sectional view showing a second embodiment of the invention.

Another embodiment of the present invention shown in FIG. 3 has the same structure as that of FIG. 2, except that each of the first axis (6) and the second axis (7) are connected to a single power transmitting axis. In this embodiment, the two axes (6) and (7) are connected to the power transmitting axis by two belts (9) and (9').

Figure 4:
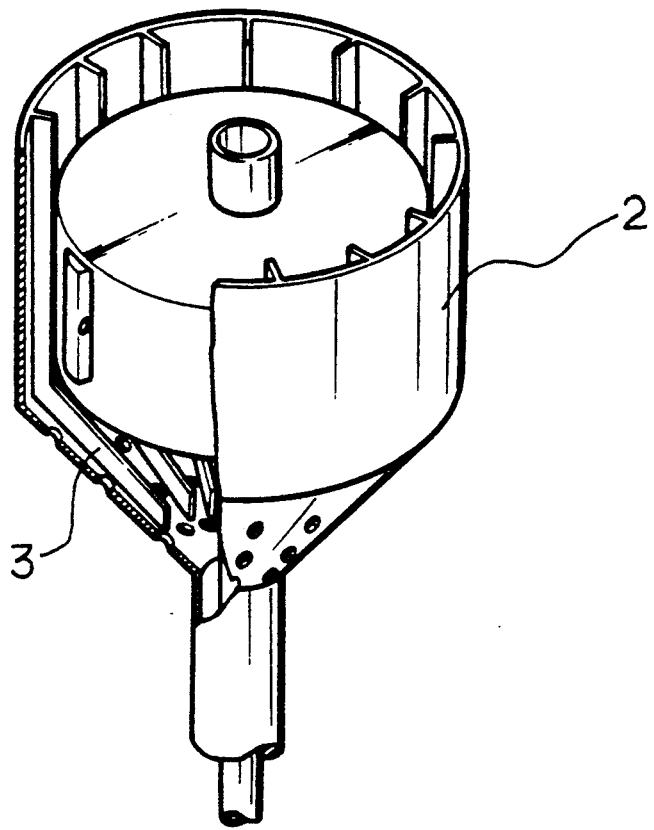
FIG. 4 is a perspective view showing a third embodiment of the invention.
Figure 5:
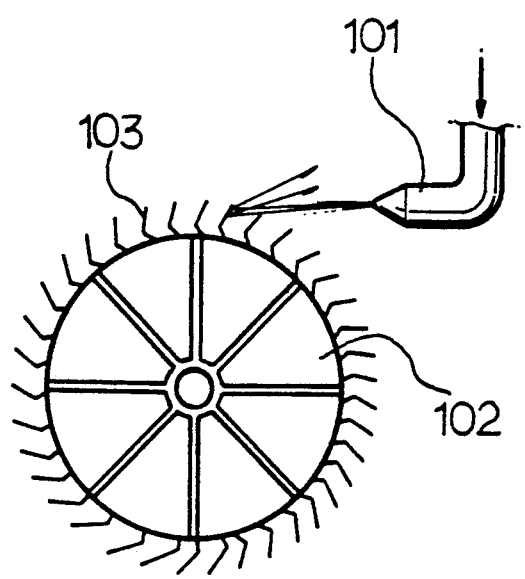
FIG. 5 is a perspective view showing a known water turbine.

Also, as shown in FIG. 4, it is possible for the rotating blades (3) of the second rotatable cylinder (2) to extend downward, reducing diameter as they approach bottom. In this structure, water is retained for a relatively longer time at the rotating blades. This type of water turbine is especially suited to large scale use when one cylinder rotates relatively slowly.

It is also possible to form a multiplicity of openings on the body of the second rotatable cylinder (2), through which the water can be extracted directly to the outside of the second rotatable cylinder (2) after striking the rotating blades (3), bringing about no negative influence on the rotation of the second rotatable cylinder (2). This type of water turbine is especially suited to small scale use when one cylinder rotates relatively rapidly.

As described above, the water turbine of the present invention improves efficiency by reducing power loss, while obtaining more energy through the re-use of power which was lost in the past.

Lastly, while most known water turbines are suited for conditions requiring high altitude and small scale, the water turbine of the present invention can be adapted to numerous conditions by controlling the number of nozzles (5) and the size of the water inlet hole (4).

It will be apparent to those skilled in the art that the above-described examples are merely illustrative of the principles of the present invention. Numerous other embodiments may be devised without departing from the scope and spirit of the invention, as defined by the following claims and their equivalents.

What is claimed is:

1. A water turbine comprising:
   a casing;
   a first rotatable cylinder mounted within the casing;
   a water inlet hole formed on the first rotatable cylinder, through which water can enter the first rotatable cylinder;
   a plurality of nozzles formed on the circumference of the first rotatable cylinder, through which the water can traverse to the outside of the first rotatable cylinder;
   a second rotatable cylinder mounted in circumscription of the circumference of the first rotatable cylinder;
   a plurality of rotating blades formed on the inner surface of the second rotatable cylinder;
   means for allowing water to traverse to the outside of the second rotatable cylinder after striking the rotating blades, the means comprising a plurality of openings through the second rotatable cylinder;
   a first rotatable axis connected to and supporting the first rotatable cylinder;
   a second rotatable axis connected to and supporting the second rotatable cylinder;
   means for transmitting the rotation of the first rotatable axis; and
   means for transmitting the rotation of the second rotatable axis.

2. A water turbine of claim 1, wherein each of the means for transmitting the rotations of the first and the second rotating axes are belts, and each of the belts is connected to a single axis.

3. A water turbine of claim 1, wherein the rotating blades of the second rotatable cylinder extend downward and have reduced diameter in the downward direction.

* * * * *